United States Patent [19]

Oosterwijk et al.

[11] 4,092,470

[45] May 30, 1978

[54] STABLE, PUMPABLE, AQUEOUS SUSPENSIONS OF ORGANIC PEROXIDES

[75] Inventors: Hendrik Harm Jannes Oosterwijk, Diepenveen; Reinder Torenbeek, Twello, both of Netherlands

[73] Assignee: Akzona Incorporated, Asheville, N.C.

[21] Appl. No.: 772,606

[22] Filed: Feb. 28, 1977

Related U.S. Application Data

[62] Division of Ser. No. 666,993, March 15, 1976, Pat. No. 4,039,475.

[30] Foreign Application Priority Data

Mar. 14, 1975 Netherlands .......................... 7507051
July 2, 1975 Netherlands .......................... 7507859

[51] Int. Cl.² .......................... C08F 2/00; C08F 4/00; C08F 14/06; C08F 214/06
[52] U.S. Cl. .................................... 526/227; 526/201; 526/202; 526/208; 526/209; 526/210; 526/228; 526/230; 526/231; 526/232; 526/344; 526/345

[58] Field of Search ............... 526/201, 202, 209, 230, 526/232, 208, 210, 231, 227, 344, 345, 228

[56] References Cited

U.S. PATENT DOCUMENTS

| | | | |
|---|---|---|---|
| 3,488,328 | 1/1970 | Koyangi et al. | 526/209 |
| 3,516,975 | 6/1970 | Meincke | 526/209 |
| 3,551,399 | 12/1970 | Yonezu et al. | 526/209 |
| 3,699,068 | 10/1972 | Flint et al. | 526/209 |
| 3,825,509 | 6/1974 | Miller | 526/345 |
| 3,945,958 | 3/1976 | Koyangi et al. | 526/230 |
| 3,988,261 | 10/1976 | Barter et al. | 526/202 |

*Primary Examiner*—Herbert J. Lilling
*Attorney, Agent, or Firm*—Francis W. Young; Robert F. Green

[57] ABSTRACT

Stable, pumpable, highly concentrated aqueous suspensions of organic peroxides containing (a) nonionic emulsifiers having a maximum HLB value of 12.5 and (b) nonionic emulsifiers having a minimum HLB value of 12.5 or anionic emulsifiers.

1 Claim, No Drawings

STABLE, PUMPABLE, AQUEOUS SUSPENSIONS OF ORGANIC PEROXIDES

This is a division of application Ser. No. 666,993, filed Mar. 15, 1976, now U.S. Pat. No. 4,039,475.

BACKGROUND OF THE INVENTION

The invention relates to a non-segregating, pumpable organic peroxide-containing aqueous suspension suitable for the (co)polymerization of ethylenically unsaturated monomers and to this suspension per se.

It is known that vinyl halides such as vinyl chloride; vinyl bromide; and vinyl fluoride can be polymerized or, in combination with vinylidene halides such as vinylidene chloride and vinylidene fluoride or in combination with other terminal $CH_2 = C <$ groups containing compounds, such as ethylene, propylene and vinyl acetate, can be copolymerized. This polymerization or copolymerization usually takes place in water. To this end, the monomer to be polymerized or the monomer mixture to be copolymerized is dispersed in water in the presence of a protective colloid or an emulsifier, followed by the addition of a compound yielding free radicals to initiate (co)polymerization. For this purpose, use may be made of at room temperature solid peroxydicarbonates such as dimyristyl peroxydicarbonate, dicetyl peroxydicarbonate, distearyl peroxydicarbonate, bis(4-tert. butylcyclohexyl) peroxydicarbonate, bis(4-tert. amylcyclohexyl) peroxydicarbonate, dicyclohexyl peroxydicarbonate and dibenzyl peroxydicarbonate. Said peroxides display storage stability at room temperature.

When for feeding purposes, however, these peroxy dicarbonates are dissolved in organic solvents such as acetone, benzene or chloroform, the chemical stability of these peroxy compounds very much decreases. Moreover, such solutions may give rise to strong reactions, spontaneous ignition and even explosions if no care is taken that the heat released upon decomposition is carried off.

U.S. Pat. No. 3,825,509 describes a process for the suspension polymerization of vinyl chloride alone or in combination with vinylidene monomers copolymerizable therewith, in which process the initiator is an emulsion of an organic peroxide in an aqueous solution containing 1 – 10% by weight of polyvinyl alcohol and 1 – 6% by weight of polyoxyethylene sorbitan monolaurate.

This emulsion has the disadvantage that it must not contain more than about 19% by weight of organic peroxide, higher concentration leading to a too viscous emulsion which is, therefore, difficult to handle. The additional disadvantage to these emulsions is that it can only be prepared at temperatures in the range of 5° – 10° C. and must be stored at 0° C. or even lower temperature.

U.S. Pat. No. 3,507,800 describes a flame resistant, pasty composition which mainly consists of water, an organic peroxide and a mutual solvent for the water and the organic peroxide. In the patent specification, a distinction is made between on the one hand peroxides derived from (cyclo) aliphatic ketones, such as methyl ethyl ketone peroxide, acetone peroxide, methyl amyl ketone peroxide, cyclopentanone peroxide, and on the other hand, benzoyl peroxide and chlorinated derivatives thereof such as 2,4-dichlorobenzoyl peroxide.

The former category is incorporated in the paste in an amount not higher than 30% by weight, benzoyl peroxide or the nuclear-chlorinated derivatives thereof, in an amount of not more than 50% by weight. As solvents for pastes containing the former category of organic peroxides are recommended liquid or water-soluble aliphatic polyoxyalkanes and alkyl esters. As solvents for benzoyl peroxide-containing pastes are mentioned compounds such as precipitated, finely divided silica, alkyl cellulose, etc., which compounds may form a gel with the water contained in the paste. Mention is also made of compounds known under the name of detergent. The compositions described in U.S. Pat. No. 3,507,800 have the disadvantage that they are pasty.

They are, therefore, less suitable to be used as catalyst in (co)polymerization reactions carried out in a closed system in order to prevent the escape of monomers, e.g., vinyl chloride, detrimental to health. In such techniques, the composition to be used should be pumpable.

DESCRIPTION OF THE INVENTION

It has now been found that if an aqueous suspension of organic peroxide solid at about 20° C. is made to contain a combination of at least 0.2% by weight of a nonionic emulsifier with an HLB-value not higher than 12.5 and at least 0.2% by weight of a non-ionic emulsifier with an HLB-value not lower than 12.5 or a combination of at least 0.2% by weight of a non-ionic emulsifier with an HLB-value not higher than 12.5 and at least 0.01% by weight of an anionic emulsifier, then there is obtained a pumpable aqueous suspension which may contain a high proportion of organic peroxide which is solid and chemically stable at about 20° C.

By HLB-value is to be understood the hydrophilic-lipophilic balance as worked out by the Atlas Powder Company and published in "The Atlas HLB-System, a time saving guide to emulsifier selection". These HLB-values are in the range of 1 to 30.

Examples of nonionic emulsifiers to be used in the process according to the invention are summarized in the following Table N.

TABLE N

| Trade Name | Chemical Name | HLB-Value |
|---|---|---|
| Surfonic N-10 | nonylphenol polyethylene oxide ether | 3.4 |
| Akyporox | nonylphenol polyethylene oxide ether | 4.4 |
| Elfapur LM-30 | fatty alcohol polyethylene oxide ether | 7.5 |
| Tergitol 15-S-3 | linear alcohol polyethylene oxide ether | 8.0 |
| Span 20 | sorbitan monolaurate | 8.6 |
| Tween 81 | sorbitan monooleate polyethylene oxide ether | 10.0 |
| Tergitol NP 15 | nonyl phenyl polyethylene oxide ether | 10.0 |
| Elfapur N-50 | nonyl phenyl polyethylene oxide ether | 10.0 |
| Elfapur N-70 | nonyl phenyl polyethylene oxide ether | 11.7 |
| Elfapur LM-75-S | fatty alcohol polyethylene oxide ether | 12.3 |
| Elfapur N-90 | nonyl phenol polyethylene oxide ether | 12.9 |
| Tergitol NP-33 | nonyl phenol polyethylene oxide ether | 14.4 |
| Tergitol 15-S-12 | linear alcohol polyethylene oxide ether | 14.5 |
| Tergitol NP-25 | nonyl phenol polyethylene oxide | 14.7 |
| Elfapur N-150 | nonyl phenyl polyethylene oxide | 15.0 |
| Tergitol NP-40 | nonyl phenyl polyethylene oxide | 16.0 |
| Tween 20 | sorbitan monolaurate polyethylene oxide ether | 16.7 |

It will be clear that within the scope of the invention, also mixtures may be used of nonionic emulsifiers having a total HLB-value not higher than or not lower than 12.5. This total HLB-value can be calculated from the HLB-values of the individual emulsifier and their weight ratios.

As examples of anionic emulsifiers to be added in combination with an emulsifier or emulsifier mixture with an HLB-value not higher than 12.5 may be mentioned:

Na-dodecylbenzene sulphonate, Na-laurylalcohol sulphate, dialkyl esters of Na-sulphosuccinate, Na-di(2-ethylhexyl) phosphate, Na-tetradecyl sulphate, $NH_4$-linear alcohol polyethylene oxide ether sulphate, Na-olefin sulphate.

An aqueous suspension according to the invention was considered pumpable when it had a viscosity of not more than 500 poises. Preference, however, is given, to suspensions having a viscosity of not more than 100 poises.

In order to prevent that the solid organic peroxides present in the suspension according to the invention can no longer be homogeneously distributed in the aqueous phase after segregation, if any, it is recommended that in the suspensions according to the invention there should be incorporated thickeners in such amounts that after segregation the solid organic peroxide can again be homogeneously distributed in the agueous phase and preferably in such amounts that such segregation is prevented.

As thickeners may be used water-soluble polymers such as carboxymethyl cellulose, methyl cellulose, hydroxy ethyl cellulose, hydroxypropyl cellulose and other water-soluble cellulose derivatives, polyvinyl alcohol, polyvinylpyrrolidone, polyacrylic acid, carboxyvinyl polymers, gelatin, starch, agar, etc. Depending on the type of thickener, the desired viscosity of the ready suspension, the nonionic emulsifiers used and the solid peroxide, the amounts of thickener to be incorporated in the suspension according to the invention may be in the range of 0.05 to 10% by weight, and preferably in the range of 0.2 to 4% by weight.

The suspensions according to the invention may be prepared by vigorously mixing and homogenizing the components with the aid of appropriate mixing equipment.

As examples of peroxides solid at a temperature of about 20° C. that may be incorporated in the suspension according to the invention may be mentioned:

1. solid aromatic diacyl peroxides, such as dibenzoyl peroxide and nuclear-substituted derivatives thereof such as bis(o-methylbenzoyl) peroxide, bis(o-methoxybenzoyl) peroxide, bis(o-ethoxybenzoyl) peroxide, bis-(o-chlorobenzoyl) peroxide;

2. solid aliphatic diacyl peroxides, such as didecanoyl peroxide, dilauroyl peroxide and dimyristoyl peroxide;

3. solid ketone peroxides such as bis(1-hydroxycyclohexyl) peroxide, 1-hydroxy-1-hydroperoxy-dicycloperoxide, bis-(1-hydroperoxycyclohexyl) peroxide;

4. solid aldehyde peroxides such as bis(1-hydroxyheptyl) peroxide;

5. solid dialkyl peroxides and diaralkyl peroxides such as dicumyl peroxide, 1,3- and 1,4(di.tert. butylperoxyisopropyl) benzene;

6. solid peresters such as mono-tert. butyl permaleate, di-tert.-butylperoxyhexahydro terephthalate, di-tert.butylperoxyadipate, di-tert. butylperoxyterephthalate, di-tert. butylperoxyphtalate, mono-tert. butylperoxyphthalate;

7. solid perketals such as 2,2-bis(4,4-detert.butylperoxycyclohexyl) propane, 1,1-ditert.butylperoxy-4-tert. butylcyclohexane;

8. solid hydroperoxides such as 2,5-dihyroperoxy-2,5-dimethylhexane, 1,3 bis($\alpha$-hydroperoxyisopropyl)benzene, 1,4 bis-($\alpha$-hydroperoxyisopropyl) benzene;

9. preferably, however, solid peroxydicarbonates such as dimyristyl peroxydicarbonate, dicetyl peroxidicarbonate, distearyl peroxydicarbonate, bis(4-tert.butylcyclohexyl) peroxydicarbonate, bis(4-tert.amylcyclohexyl) peroxidicarbonate, dicyclohexyl peroxydicarbonate and dibenzyl peroxydicarbonate.

The invention will be elucidated in the following examples. The viscosity values mentioned in these examples are in poises and were measured with a Brookfield rotational type viscometer, model HB, at a speed of 5 revolutions per minute of the measuring spindle.

EXAMPLE 1

In a solution of 10 g. of methyl cellulose and 5 g. of nonionic emulsifier with an HLB-value of 15.0 (Elfapur N-150) in 313 ml. of water there were distributed 667 g. of a dibenzoyl peroxide wetted with water (25% $H_2O$). The mass was homogenized with the aid of a triple-roller mill and a highly viscous, non-pourable suspension was obtained. To this suspension there was added 5 g. of a nonionic emulsifier with an HLB-value of 10.0 (Elfapur N-50). A pourable, pumpable aqueous suspension with a viscosity of 30 poises was obtained. Its composition was as follows:

50% dibenzoyl peroxide
48% water
0.5% nonionic emulsifier, HLB = 15.0
0.5% nonionic emulsifier, HLB = 10.0
1% methyl cellulose

EXAMPLE 2

In a solution of 5 g. of hydroxypropyl methyl cellulose and 5 g. of nonionic emulsifier with a HLB-value of 14.7 (Tergitol NP-35) in 318 ml. of water there was dispersed 667 g. of a dibenzoyl peroxide wetted with water (25% $H_2O$). The mass was homogenized with the aid of a triple-roller mill and a highly viscous non-pourable suspension was obtained. To this suspension there was subsequently added 5 g. of a nonionic emulsifier with an HLB-value of 10.0 (Tergitol NP-15). A pourable, pumpable aqueous suspension was obtained having a viscosity of 14 poises and the following composition:

50% dibenzoyl peroxide
48.5% water
0.5% nonionic emulsifier, HLB 14.7
0.5% nonionic emulsifier, HLB 10.0
0.5% hydroxypropyl methyl cellulose

EXAMPLE 3

In a solution of 5 g. of hydroxypropyl methyl cellulose and 5 g. of nonionic emulsifier with an HLB-value of 10.0 (Elfapur N-50) in 323 ml. of water there was homogeneously distributed 667 g. of a dibenzoyl peroxide wetted with water (25% $H_2O$). A high viscous, non-pourable suspension of the following composition was obtained:

50% dibenzoyl peroxide
49% water
0.5% nonionic emulsifier, HLB = 10.0

0.5% hydroxypropyl methyl cellulose

The suspension was divided into three portions of equal amounts by weight, after which to each portion there was added a certain amount of sodium lauryl alcohol sulphate as anionic emulsifier. Subsequently, of each portion, the viscosity was measured. The added amounts of sodium lauryl alcohol sulphate and the measured viscosities are listed in the following table.

| Na-Lauryl Alcohol Sulphate in % by Weight | Viscosity in Poise |
| --- | --- |
| — | — |
| 0.02 | 640 |
| 0.25 | 380 |
| 0.1 | 55 |

EXAMPLES 4 – 11

Suspension having the compositions and viscosities given in the following table were prepared in the same way as described in Example 1. When only one of the two emulsifiers was used, always a pasty or highly viscous suspension was obtained. Addition of the other emulsifier resulted in a considerable decrease in viscosity.

| Composition in % by Weight | 4 | 5 | 6 | 7 | 8 | 9 | 10 | 11 |
| --- | --- | --- | --- | --- | --- | --- | --- | --- |
| Bis(2,4-dichlorobenzoyl)peroxide | 30.0 | | | | | | | |
| Bis(o-methylbenzoyl)peroxide | | 40.0 | | | | | | |
| Dilauroyl peroxide | | | 50.0 | | | | | |
| 1-Hydroxy-1'-hydroperoxydicyclohexyl peroxide | | | | 45.0 | | | | |
| Bis(1-hydroperoxy-cyclohexyl) peroxide | | | | | 45.0 | | | |
| Dicumyl peroxide | | | | | | 40.0 | | |
| 2,2-Bis(4,4-di-tert.butylperoxycyclohexyl)propane | | | | | | | 40.0 | |
| Bis(1-hydroxyheptyl)peroxide | | | | | | | | 35.0 |
| Water | 64.25 | 58.0 | 45.7 | 51.04 | 51.0 | 56.0 | 57.0 | 61.0 |
| Methyl cellulose | 0.75 | 1.0 | | | | 2.0 | 1.0 | |
| Hydroxyethyl cellulose | | | 0.3 | | | | | |
| Polyvinyl alcohol | | | | | 2.0 | | | 2.0 |
| Elfapur N-150 | 2 | | 2 | | | 1 | | |
| Tween 20 | | | | | 1 | | | |
| Elfapur N-50 | 2 | | 2 | | | 1 | | |
| Tergitol NP-33 | | 0.5 | | | | | | |
| Tergitol NP-35 | | | | 18 | | | 1 | |
| Elfapur N-70 | | 0.5 | | | | | | |
| Tergitol NP-15 | | | 1.8 | | | 1 | | |
| Tergitol 15-S-12 | | | | | | | | 1 |
| Tergitol 15-S-13 | | | | | | | | 1 |
| Span 20 | | | | | 1 | | | |
| Viscosity in poises | | | 31 | 70 | | 15 | 77 | 141 |
| Segregation after 24 hrs | slight | slight | none | none | none | slight | none | none |
| after 170 hrs. | mod. | mod. | none | slight | slight | mod. | none | none |

EXAMPLE 12

In a solution of 10 g. of methyl cellulose and 10 g. of nonionic emulsifier with an HLB-value of 15.0 (Elfapur N-150) in 560 ml. of water there were distributed 360 g. of dilauroyl peroxide and 50 g. of a bis(o-methylbenzoyl) peroxide wetted with water (20% $H_2O$). The mass was homogenized to a viscous suspension having a viscosity of >300 poises with the aid of a triple-roller mill. Subsequently, 10 g. of a nonionic emulsifier with an HLB-value of 10.0 (Elfapur N-50) were added, with stirring. As a result, the viscosity dropped to 39 poises. The composition of this pourable, pumpable suspension was as follows:

36% dilauroyl peroxide
4% bis(o-methylbenzoyl) peroxide
57% water
1% nonionic emulsifier, HLB = 15.0
1% nonionic emulsifier, HLB = 10.0
1% methyl cellulose

EXAMPLE 13

In the same way as described in Examle 12, a suspension of dilauroyl peroxide and bis(4.tert.butylcyclohexyl) peroxydicarbonate was prepared having the following composition.

36% dilauroyl peroxide
4% bis(4-tert.butylcyclohexyl) peroxydicarbonate
58% water
0.5% nonionic emulsifier, HLB = 15.0
0.5% nonionic emulsifier, HLB = 10.0
1% methyl cellulose Before the addition of the nonionic emulsifier HLB = 10.0 (Elfapur N-50), the suspension was not pourable. After the addition thereof, the viscosity dropped to 31 poises.

EXAMPLE 14

In a solution of 5 g. of polyvinyl alcohol and 20 g. of a nonylphenyl polyethylene oxide with an HLB-value of 14.7 (Tergitol NP-35) in 665 ml. of water there was homogeneously distributed 300 g. of dicetylperoxydicarbonate. The resulting paste was divided into 5 equal portions after which to each portion there was added 4 g. of the nonionic emulsifiers with an HLB-value <12.5. The aqueous suspensions obtained were compared as follows:

30.0% dicetylperoxycarbonate
0.5% polyvinyl alcohol
65.5% water
2.5% emulsifier, HLB-value 14.7
2.0% emulsifier, HLB-value <12.5

The added emulsifiers with HLB-values of 14.7 and the measured viscosities of the resulting suspensions are listed in the following table.

| Added Nonionic Emulsifier | HLB-Value | Viscosity |
|---|---|---|
| Sulfonic N-10 | 3.4 | 54 |
| Akyporox NP-15 | 4.4 | 48.5 |
| Tergitol 15-S-3 | 8.0 | 32.5 |
| Tergitol NP-15 | 10.0 | 9 |
| Elfapur N-70 | 11.7 | 22 |

The suspensions obtained were stable. The suspensions obtained with the use of Elfapur N-70 had thixotropic properties.

EXAMPLE 15

In a solution of 5 g. of polyvinyl alcohol in 582 ml. of water there was dispersed 600 g. of bis(4-tert.butylcyclohexyl) peroxydicarbonate and 6 g. of a nonionic fatty alcohol-polyethylene oxide having an HLB-value of 7.5 (Elfapur LM-30). The resulting non-pourable paste was divided into 6 equal portions, after which to each portion 1 g. of a nonionic emulsifier with an HLB-value between 12 and 16.5 was added. The resulting aqueous suspensions were composed as follows:

50.0% bis(4-tert.butycyclohexyl) peroxydicarbonate
0.5% polyvinyl alcohol
48.5% water
0.5% emulsifier, HLB-value 7.5
0.5% emulsifier, HLB-value 12–16.5

The added emulsifiers and the measured viscosities of the suspensions obtained are listed in the following table.

| Added Nonionic Emulsifier | HLB-Value | Viscosity |
|---|---|---|
| Elfapur LM-75-S | 12.3 | stiff, paste |
| Elfapur N-90 | 12.9 | 10 |
| Tergitol NP-33 | 14.4 | 4 |
| Tergitol 15-S-12 | 14.5 | 4 |
| Elfapur N-150 | 15.0 | 3 |
| Tergitol NP-40 | 16.0 | 3 |

EXAMPLE 16

In the same way as described in Example 1, suspensions were prepared of the composition given in the following table. Of these compositions, the stabilities and the viscosities were measured. The results obtained are also given in the following table.

| Composition | percent by weight | | | |
|---|---|---|---|---|
| bis(4-tert.butyl p.o. dicarbonate) | 50 | 50 | 50 | 50 |
| polyvinyl alcohol | — | 1 | 2 | 3 |
| nonylphenol-polyethylene oxide, HLB 10.0 | 0.5 | 0.5 | 0.5 | 0.5 |
| nonylphenyl-polyethylene oxide, HLB 14.7 | 0.5 | 0.5 | 0.5 | 0.5 |
| water | 49 | 48 | 47 | 46 |
| Viscosity | 9 | 10 | 43 | 135 |
| Segregation after 24 hrs. | Strong[1] | Moderate[2] | Slight[2] | None |
| after 170 hrs. | Strong[1] | Strong[1] | Moderate[2] | None |

[1] composition can no longer be homogenized
[2] composition can be homogenized

EXAMPLE 17

To a suspension obtained by homogenizing 5 g. of hydroxyethyl cellulose, 585 ml. of water, 400 g. of bis(4-tert. butylcyclohexyl) peroxydicarbonate and 3 g. of a fatty alcohol alkyl polyethylene oxide ether with an HLB-value of 7.5 (Elfapur LM-30) there was added as anionic emulsifier, sodium-dodecylbenzene sulphate in an amount of 0.01% by weight. Next, the viscosity was measured of suspensions containing other amounts of Na-dodecylbenzene sulphonate. The added amounts of Na-dodecylbenzene sulphonate and the measured viscosities in poises are summarized in the following table:

| % by Weight Na-Dodecylbenzene Sulphonate | Viscosity |
|---|---|
| 0.01 | 106 |
| 0.015 | 48 |
| 0.02 | 35 |
| 0.025 | 32 |

EXAMPLE 18

In a solution of 3 g. of hydroxyethyl cellulose in 652 ml. of water there was dispersed 300 g. of dicetyl peroxydicarbonate and 25 g. of sorbitan monolaurate, a nonionic emulsifier with an HLB-value of 8.6 (Span 20). The resulting, non-pourable, pasty mass was mixed with 20 g. of sorbitan monolaurate polyethylene oxide ether, a nonionic emulsifier with an HLB-value of 16.7 (Tween 20). A pourable pumpable suspension having a viscosity of 170 poises was obtained. Its composition was as follows:

30.0% dicetyl peroxydicarbonate
0.3% hydroxyethyl cellulose
65.2% water
2.5% sorbitan monolaurate, HLB-value 8.6
2.0% sorbitan monolaurate polyethylene oxide ether HLB-value 16.7

EXAMPLE 19

In the same way as described in Example 5, a suspension of the following composition was prepared.

30.0% dicetyl peroxydicarbonate
0.5% methyl cellulose
66.6% water
2.0% sorbitan monoolate polyethylene oxide ether, HLB-value 10.0 (Tween 81)
0.9% sorbitan monolaurate, HLB-value 16.7 (Tween 20)

Its viscosity was 22 poises.

EXAMPLE 20

In a solution of 5 g. of hydroxyethyl cellulose and 20 g. of a nonylphenol polyethylene oxide ether with an HLB-value of 15.0 (Elfapur N-150) in 555 ml. of water, there was homogeneously distributed 400 g. of dicyclohexyl peroxidicarbonate.

To the resulting pasty mass there was added 2.0 g. of a nonylphenol polyethylene oxide ether with an HLB-value of 10.0 (Elfapur N-50). A pourable, pumpable suspension having a viscosity of 54 poises was obtained. Its composition was as follows:

40.0% dicyclohexyl peroxydicarbonate
0.5% hydroxyethyl cellulose
55.5% water 2.0% nonylphenol polyethylene oxide ether, HLB 1.50
2.0% nonylphenol polyethylene oxide ether, HLB 10.0

EXAMPLE 21

In a solution of 5 g. of methyl cellulose and 20 g. (Elfapur N-150) of a nonylphenol polyethylene oxide ether with an HLB-value of 15.0 in 655 ml. of water there was homogeneously distributed 300 g. of distearyl peroxydicarbonate. To the resulting pasty mass there was added 20 g. of a nonylphenol polyethylene oxide having an HLB-value of 10.0. A pourable, pumpable suspension having a viscosity of 75 poises was obtained. Its composition was as follows:

30.0% distearyl peroxydicarbonate
65.6% water
0.5% methyl cellulose
2.0% nonylphenol polyethylene oxide ether, HLB-value 15.0
2.0% nonylphenol polyethylene oxide ether, HLB-value 10.0

The suspensions according to the invention containing a peroxydicarbonate are particularly suitable for the (dis)continuous polymerization of vinylchloride. It was found that there was far less reactor fouling than when in a polymerization under the same conditions use was made only of a solid peroxydicarbonate.

EXAMPLE 22

In a solution of 3 g. of hydroxyethyl cellulose and 20 g. of a nonylphenyl polyethylene oxide with an HLB-value of 15.0 (Elfapur N-150) in 657 ml. of water there was homogeneously distributed 300 g. of dicetyl peroxydicarbonate. To the pasty mass there was subsequently added 20 g. of a nonylphenyl polyethylene oxide having an HLB-value of 10.0 (Tergitol NP-15). The resulting suspension had a viscosity of 13 poises and did not show any segregation after 4 weeks' storage at 22° C., 0.53 g. of this suspension was used for the suspension polymerization of 200 g. of vinyl chloride at 55° C. in a glass autoclave.

After termination of the polymerization, the degree of fouling of the reactor was measured by screening the polyvinyl chloride with a sieve having a mesh width of 500 $\mu$m and determining the amount of material retained by the sieve. This amount was 0.33%. In a similar determination, in which, however, 0.16 g. of pure, solid dicetyl peroxydicarbonate was used, the amount of material retained by the sieve was found to be 3.1% by weight.

The invention is not limited to the embodiment described above. Within the scope of the invention, other applications of the suspension according to the invention are conceivable, such as the polymerization of acrylates and the copolymerization of styrene.

What is claimed is:

1. In a process for aqueous suspension polymerization of vinyl halide alone or in combination with a compound containing a terminal $CH_2=CH<$ group copolymerizable with said vinyl halide, or an acrylate, the improvement comprising reacting said monomers in the presence of a pumpable, stable, aqueous suspension which comprises at least about 20 weight % of an organic peroxide which is solid at about 20° C, at least about 0.2 weight % of a nonionic emulsifier having a maximum HLB-value of 12.5 and an emulsifier selected from the group consisting of nonionic emulsifiers having a minimum HLB-value of 12.5, and anionic emulsifiers, said nonionic emulsifier of minimum HLB-value of 12.5 percent present in an amount of at least about 0.2 weight %, and said anionic emulsifier present in an amount of at least about 0.01 weight %.

* * * * *